(12) United States Patent
Given et al.

(10) Patent No.: US 6,803,064 B1
(45) Date of Patent: Oct. 12, 2004

(54) CALCIUM FORTIFIED BEVERAGE COMPOSITIONS AND PROCESS FOR PREPARING THE SAME

(75) Inventors: Peter Given, Ridgefield, CT (US); Pei K. Chang, Cortlandt Manor, NY (US); Patricia Amenedo, Valhalla, NY (US); William Mutilangi, Croton-on-Hudson, NY (US)

(73) Assignee: Pepsico, Inc., Purchase, NY (US)

( * ) Notice: Subject to any disclaimer, the term of this patent is extended or adjusted under 35 U.S.C. 154(b) by 0 days.

(21) Appl. No.: 09/593,759

(22) Filed: Jun. 14, 2000

(51) Int. Cl.[7] .............................. A23L 1/304; A23L 2/44
(52) U.S. Cl. ........................... 426/74; 426/66; 426/590; 426/599; 426/654
(58) Field of Search ..................... 426/74, 66, 590, 426/599, 654

(56) References Cited

U.S. PATENT DOCUMENTS

| | | | |
|---|---|---|---|
| 4,322,407 A | | 3/1982 | Ko |
| 4,325,975 A | * | 4/1982 | Lindon et al. ............... 426/74 |
| 4,551,342 A | | 11/1985 | Nakel et al. ............... 426/548 |
| 4,722,847 A | | 2/1988 | Heckert |
| 4,737,375 A | | 4/1988 | Nakel et al. |
| 4,786,510 A | | 11/1988 | Nakel et al. |
| 4,830,862 A | * | 5/1989 | Braun et al. ............... 426/74 |
| 4,851,221 A | | 7/1989 | Pak et al. |
| 4,872,919 A | | 10/1989 | Bucher et al. |
| 4,919,963 A | | 4/1990 | Heckert |
| 4,992,282 A | | 2/1991 | Meshanso et al. |
| 4,994,283 A | | 2/1991 | Meshanso et al. |
| 5,075,499 A | | 12/1991 | Walsdorf et al. |
| 5,118,513 A | | 6/1992 | Meshanso et al. |
| 5,128,374 A | | 7/1992 | Kochanowski |
| 5,151,274 A | | 9/1992 | Saltman et al. |
| 5,186,965 A | | 2/1993 | Fox et al. |
| 5,225,221 A | | 7/1993 | Camden et al. |
| 5,232,709 A | | 8/1993 | Saltman et al. |
| 5,314,919 A | | 5/1994 | Jacobs |
| 5,389,387 A | | 2/1995 | Zuniga et al. |
| 5,401,524 A | | 3/1995 | Burkes et al. |
| 5,422,128 A | | 6/1995 | Burkes et al. |
| 5,424,082 A | | 6/1995 | Dake et al. |
| 5,445,837 A | | 8/1995 | Burkes et al. |
| 5,468,506 A | | 11/1995 | Andon |
| 5,474,793 A | | 12/1995 | Meyer et al. |
| 5,817,351 A | | 10/1998 | DeWille et al. |
| 5,851,578 A | | 12/1998 | Gandhi .......................... 426/590 |
| 6,326,038 B1 | * | 12/2001 | Brafford et al. ............... 426/74 |
| 2002/0146486 A1 | * | 10/2002 | Yang et al. .................... 426/74 |

FOREIGN PATENT DOCUMENTS

| | | | |
|---|---|---|---|
| CN | 1264682 A | * | 8/2000 |
| JP | 04271894 A | * | 9/1992 |
| WO | WO 93/25095 | | 12/1993 |

OTHER PUBLICATIONS

Applicants calcium source chart.*
Couzy, F. et al., *Am. J. Clin. Nutr.* (1995), vol. 62, pp. 1239–1244.
Varo–Galvan & Guillen–Sempere, *Alimentaria*, No. 284, pp. 53–59 (1997).
*Nutraceuticals Int'l*, Dec. 1998, pp. 20–21.
Ranhotra, et al., *Cereal Chemistry*, vol. 74, No. 4, pp. 361–363 (1997).
Packard, et al., "Absorbability of Calcium from Calcium Sulfate, a Dortificant", poster, IFT Annual Meeting, Osteoporosis Res. Cent., Creighton Univ., Omaha, Nebraska (1995).

* cited by examiner

*Primary Examiner*—Helen Pratt
(74) *Attorney, Agent, or Firm*—Fitzpatrick, Cella, Harper & Scinto

(57) ABSTRACT

Ready to drink beverage compositions containing a nutritionally significant amount of calcium and a process for making the same. Calcium sulfate is used as the sole source of calcium.

25 Claims, No Drawings

CALCIUM FORTIFIED BEVERAGE COMPOSITIONS AND PROCESS FOR PREPARING THE SAME

BACKGROUND OF THE INVENTION

1. Field of the Invention

The present invention relates to calcium fortified beverage compositions and a process of preparing the same. More particularly, the invention relates to ready to drink beverage compositions fortified with a nutritionally significant amount of calcium, using calcium sulfate as the sole source of calcium.

2. Related Background Art

Calcium fortification of both beverages and food products is known in the art. Known calcium fortification techniques employ a variety of calcium sources, in-situ calcium salt formation or adjuvants to enhance dietary calcium utilization.

However, each of the above-identified calcium fortification sources requires pre-blending or high shear mixing to dissolve the calcium source at finished beverage strength. Additionally, each requires pre-dissolution of an organic acid, followed by high shear mixing/dispersion of a poorly soluble calcium source (carbonate, oxide or hydroxide) which is difficult to achieve in a finished beverage strength due to typical manufacturing plant configurations and possibly intermittent harsh local conditions which destroy other fortificants and sensitive flavors.

U.S. Pat. No. 4,830,862 relates to the use of calcium sulfate, preferably in combination with calcium chloride, to improve the solubility of other calcium sources (mainly calcium hydroxide and calcium carbonate), in the presence of significant amounts of edible aids, such as phosphoric and citric acids. The calcium sulfate-chloride combination is said to reduce precipitation and deposition of calcium salts on equipment surfaces during pasteurization.

U.S. Pat. No. 5,424,082 relates to beverage compositions which are resistant to browning and which contain both added calcium and vitamin C. The compositions therein necessarily contain erythorbic acid and a pH control system to accomplish the improved color stability.

U.S. Pat. No. 5,474,793 relates to the calcium fortification of ready-to-drink not-from-concentrate fruit juice beverages that are made by recirculation of juice containing citric and malic acids and addition of a powdered calcium salt in an area of turbulent flow. The powdered calcium sources may include hydroxide, carbonate, lactate, phosphate, sulfate, and mixtures thereof. While calcium sulfate, which is relatively insoluble, is mentioned, it is not proffered as a sole source of calcium.

U.S. Pat. No. 5,401,524 relates to storage stable calcium fortified pre-mixes for beverage concentrate production. Sulfate is listed as one of several possible acidic anions. The pre-mixes also contain citric and malic acids and have a pH less than or equal to 3.5.

U.S. Pat. No. 4,325,975 relates to mineralized drinking water that contains strontium, magnesium, calcium and lithium ions supplied by water soluble salts such as sulfates. However, the amount of calcium contained in the mineralized water is significantly less than the amount desired in a calcium fortified beverage, considering the recommended daily intake for calcium.

In addition to the various calcium fortification schemes known in the art, there are various compositions that inherently contain significant levels of calcium in addition to other minerals. Mineral water is such a composition. Varo-Galvan & Guillen-Sempere, *Alimentaria*, No. 284, pp. 53–59 (1997), report the presence of calcium among other minerals in samples of natural spring waters. In addition, CONTREX is a mineral water product marketed in Europe said to contain, inter alia, calcium sulfite. *Nutraceuticals Int'l*, December 1998, pp. 20–21.

Certain calcium sources are employed in food and/or beverage compositions for purposes other than calcium fortification. For example, a new powdered soy beverage mix, which is marketed as "non-mineral & vitamin fortified", contains calcium sulfate most likely as an anti-caking/flow agent. Further, EP 0 644 727 relates to a psyllium husk (fiber) beverage mix containing a divalent cation salt of a strong inorganic acid, such as calcium sulfate. The anhydrous calcium sulfate appears to stabilize the fiber against caking in the dry mix and to act as a flow agent.

In contrast to the above-mentioned art, the invention described and claimed in the present application relates to the use of calcium sulfate as a sole source to fortify a ready to drink beverage composition, in particular purified water. It has been discovered that use of calcium sulfate provides both a distinct taste and beverage making process advantages as compared with other commonly employed chemical forms or salts of calcium.

These and additional objects and advantages of the present invention are shown from the description below. The disclosures of the publications cited above and throughout this specification are incorporated in their entirety to more fully describe the invention and to demonstrate the state of the art.

SUMMARY OF THE INVENTION

This invention provides a ready to drink beverage composition containing a nutritionally significant amount of calcium provided by calcium sulfate.

This invention also provides a process for producing a calcium fortified beverage composition which comprises:

(a) combining a ready to drink beverage and calcium sulfate to form a solution; and (b) preserving the solution to form the calcium fortified beverage composition.

This invention further provides a method of providing a nutritionally significant amount of calcium to a subject comprising administering to a subject a calcium fortified beverage composition according to this invention.

DETAILED DESCRIPTION OF THE INVENTION

The present invention provides a calcium fortified ready to drink beverage composition. Specifically, the beverage compositions of the present invention are capable of delivering a nutritionally significant amount of calcium per serving using calcium sulfate as the sole source of dietary calcium.

Calcium sulfate exhibits a number of characteristics which render it particularly suitable for use in the present invention. First and quite importantly, it has a significantly bland, neutral taste at 10% of the recommended daily intake value (abbreviated "RDI" or "RDV" herein) per serving, i.e., at 100 mg Ca/8oz or 0.1g/236.6 ml. It is also compatible with other IBM beverage ingredients and manufacturing processes. Further, the bioavailability of calcium sulfate is comparable to other commonly employed organic and inorganic calcium salts. Ranhotra, et al., *Cereal Chemistry*, Vol. 74, No. 4, pp. 361–363 (1997); Packard, et al., "Absorbability of Calcium from Calcium Sulfate, a Fortificant", poster, IFT Annual Meeting, Osteoporosis Res. Cent., Creighton Univ., Omaha, Nebr. (1995). Thus it has been determined that using calcium sulfate as a sole calcium source in a beverage composition results in a completely clear product exhibiting no visual haze or sediment over shelf life and having a bland, neutral taste. The calcium sulfate suitable for use in the present invention is commercially available through various sources, for example U.S. Gypsum.

As used herein, "calcium sulfate" is understood to include the anhydrous form as well as various hydrate forms such as dihydrate, tetrahydrate, hexahydrate, and so on, and blends and mixtures thereof. In a particularly preferred embodiment, the dihydrate form of calcium sulfate is used as the calcium source.

The amount of calcium contained in the calcium supplemented beverages of the invention is limited only by the solubility limits of calcium sulfate form(s) used. Thus, the amount of calcium sulfate used in the compositions of the present invention is an amount sufficient to provide a nutritionally significant amount of calcium, which is understood to be an amount at least about 1% of the U.S. RDV of calcium per serving of the beverage (i.e., about 10 mg Ca/8 oz.), up to the solubility limit of the particular calcium sulfate form(s) used. In a preferred embodiment, calcium sulfate is added in an amount sufficient to provide about 10% U.S. RDV of calcium per serving. The present U.S. RDV of calcium is 1000 mg.

Thus, the ready to drink beverage compositions of the invention comprise calcium sulfate and purified water. In a preferred embodiment, the ready to drink beverage compositions of the invention consist essentially of purified water and calcium sulfate. In a particularly preferred embodiment, the ready to drink beverage compositions consist of purified water and calcium sulfate.

As used herein, "purified water" refers to water that has been treated to remove substantially all mineral content of the water prior to supplementation with calcium as disclosed herein. Methods of producing purified water are known to those of ordinary skill in the art and include deionization, distillation, filtration and reverse osmosis ("R—O"), among others. The terms "purified water","demineralized water", "distilled water" and "R—O water" are understood to be synonymous herein, referring to water from which substantially all mineral content has been removed, typically containing no more than about 10 ppm total dissolved solids.

The beverages of the invention can optionally contain a flavor component, for example fruit flavors, botanical flavors and mixtures thereof. As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors orange, lemon, lime, and grapefruit, and such flavors as apple, grape, cherry, and pineapple flavors and the like, and mixtures thereof.

As used herein, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include kola flavors, tea flavors, and the like, and mixtures thereof. The flavor component can further comprise a blend of various of the above-mentioned flavors The particular amount of the flavor component useful for imparting flavor characteristics to the beverages of the present invention will depend upon the flavor(s) selected, the flavor impression desired, and the form of the flavor component. Those skilled in the art are readily able to determine the amount of any particular flavor component(s) used to achieve the desired flavor impression.

Additional non-mineral nutritional supplement ingredients may also be present in the calcium fortified beverage compositions of the present invention. Such non-mineral nutritional supplement ingredients are known to those of ordinary skill in the art and include, without limitation, antioxidants and vitamins, including Vitamins A, D, E (tocopherol), C (ascorbic acid), B (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices and are preferably present in amounts between about 1% to about 100% RDV, where such RDV are established. When present, the non-mineral nutritional supplement ingredient(s) is preferably present in an amount of from about 5% to about 20% RDV, where established. In a particularly preferred embodiment, the beverage compositions of the invention contain Vitamin E, optionally with Vitamin C.

The calcium fortified beverage compositions of this invention may also include a preservative system. As used herein, the "preservation system" includes all preservatives approved for use in food and beverage compositions, including without limitation, sodium benzoate, potassium benzoate, sodium sorbate, potassium sorbate, EDTA, BRA, BHT, TBHQ, dehydroacetic acid, dimethyldicarbonate, ethoxyquin, heptylparaben, and combinations thereof. Preservative systems can be used in amounts not exceeding mandated maximum levels.

This invention also provides a method for preparing a calcium fortified ready to drink beverage composition comprising calcium sulfate which comprises:

(a) combining a ready to drink beverage and calcium sulfate to form a solution; and (b) preserving the solution to form the calcium fortified beverage composition.

It has been discovered that calcium sulfate, in particular calcium sulfate dihydrate, can be freely dissolved at finished beverage strength in ready to drink beverages without any pre-blends or high shear mixing requirements. Thus, the calcium fortified beverages of the present invention can be produced simply by combining a ready to drink beverage composition desired to be fortified with calcium with the desired amount of calcium sulfate and optional ingredients. Alternatively, the calcium fortified beverage compositions of the present invention can be initially prepared according to any known method. In a preferred embodiment of the method, the ready to drink beverage is purified water.

In the second step, the beverage composition undergoes a preservation step which can comprise addition of a preservative system as discussed above or the beverage can be otherwise treated to render it safe for consumption over the shelf life of the product. For example, as the second step in the method of the present invention, the calcium fortified beverage can be subjected to typical pasteurization processes including, but not limited to, hot-filling, aseptic packaging, ozonation, radiation, UV light, high pressure, membrane permeation, pulsed electric field, sonication, and combinations thereof. Of these methods, ozonation is the preferred method used in the food and beverage industry due to its ease of application and low cost. However, ozonation has been found to react unfavorably with many beverages containing organic calcium salts, producing a brown color, a visible white precipitate or a significant off-taste, presumably due to oxidation of the organic portion of the calcium salt. It has now been discovered, however, that when calcium sulfate, in particular calcium sulfate dihydrate, is used as the sole source of calcium fortification, ozonation produces only a slight off-taste which can be completely eliminated with the addition of ascorbic acid. Thus, the use of calcium sulfate as the sole source of calcium provides a further advantage of low cost production of calcium fortified ready to drink beverages.

The examples which follow are intended as an illustration of certain preferred embodiments of the invention, and no limitation of the invention is implied.

EXAMPLE 1

Calcium fortified water was prepared by combining the ingredients listed in Table 1 in the indicated amounts.

TABLE 1

| Ingredient | Quantity |
| --- | --- |
| calcium sulfate dihydrate | 0.9 g |
| ascorbic acid | 0.03 g |
| purified drinking water* | 500 ml |

*AQUAFINA ® was used as the purified drinking water.

The resulting water can be ozonated, hot filled or aseptically packaged.

EXAMPLE 2

Calcium and vitamin E fortified water was prepared by combining the ingredients listed in Table 2 in the indicated amounts.

TABLE 2

| Ingredient | Quantity |
| --- | --- |
| calcium sulfate dihydrate | 0.9 g |
| ascorbic acid | 0.03 g |
| vitamin E | 0.006 g |
| purified drinking water | 500 ml |

The resulting water can be hot filled or aseptically packaged. The resulting product is crystal clear and has no off-taste, bitterness or astringency as compared to non-fortified water.

EXAMPLE 3

Calcium and vitamin E fortified water was prepared by combining the ingredients listed in Table 3 in the indicated amounts.

TABLE 3

| Ingredient | Quantity |
| --- | --- |
| calcium sulfate dihydrate | 0.9 g |
| ascorbic acid | 0.03 g |
| vitamin E | 0.006 g |
| potassium benzoate | 0.26 |
| potassium sorbate | 0.07 |
| purified drinking water | 500 ml |

The resulting water, because it contains preservatives, can be cold filled.

Other variations and modifications of this invention will be obvious to those skilled in this art. This invention is not to be limited except as set forth in the following claims.

What is claimed is:

1. A calcium fortified beverage composition consisting of:
   purified water, and
   a calcium source consisting of a hydrate form of calcium sulfate,
   wherein said calcium source provides about 10% U.S. RDV of calcium per serving of said calcium fortified beverage composition.

2. The calcium fortified beverage composition according to claim 1, wherein the hydrate form of calcium sulfate is calcium sulfate dihydrate.

3. A calcium fortified beverage composition consisting of:
   purified water,
   one or more non-mineral nutritional supplements, and
   a calcium source consisting of a hydrate form of calcium sulfate,
   wherein said calcium source provides about 10% U.S. RDV of calcium per serving of said calcium fortified beverage composition.

4. The calcium fortified beverage composition according to claim 3, wherein the non-mineral nutritional supplement is chosen from the group consisting of vitamin A, vitamin D, tocopherol, ascorbic acid, thiamine, riboflavin, vitamin $B_6$, vitamin $B_{12}$, vitamin K, niacin, folic acid, biotin, and combinations thereof.

5. A method of providing about 10% of the U.S. RDV of calcium to a subject comprising administering to the subject the calcium fortified beverage composition of claim 1.

6. A calcium fortified beverage composition consisting of:
   purified water,
   a flavor component, and
   a calcium source consisting of a hydrate form of calcium sulfate,
   wherein said calcium source provides about 10% U.S. RDV of calcium per serving of said calcium fortified beverage composition.

7. The calcium fortified beverage composition according to claim 6, wherein the flavor component is selected from fruit flavors, botanical flavors, and mixtures thereof.

8. A calcium fortified beverage composition consisting of:
   purified water,
   a preservative system, and
   a calcium source consisting of a hydrate form of calcium sulfate,
   wherein said calcium source provides about 10% U.S. RDV of calcium per serving of said calcium fortified beverage composition.

9. The calcium fortified beverage composition according to claim 8, wherein the preservative system is selected from the group consisting of sodium benzoate, potassium benzoate, sodium sorbate, potassium sorbate, EDTA, BHA, BHT, TBHQ, dehydroacetic acid, dimethyldicarbonate, ethoxyquin, heptylparaben, and combinations thereof.

10. A method for producing a calcium fortified beverage composition consisting of:
   (a) combining purified water and a calcium source consisting of a hydrate form of calcium sulfate to form a solution,
   wherein said calcium source provides about 10% U.S. RDV of calcium per serving of said calcium fortified beverage composition; and
   (b) preserving the solution to form the calcium fortified beverage composition.

11. The method according to claim 10, wherein the hydrate form of calcium sulfate is calcium sulfate dihydrate.

12. A method for producing a calcium fortified beverage composition consisting of:
   (a) combining purified water and a calcium source consisting of a hydrate form of calcium sulfate to form a solution, wherein said calcium source provides about 10% U.S. RDV of calcium per serving of said calcium fortified beverage composition;
   (b) adding one or more non-mineral nutritional supplements
   (c) preserving the solution to form the calcium fortified beverage composition.

13. The method according to claim 12, wherein the one or more non-mineral nutritional supplements is chosen from the group consisting of vitamin A, vitamin D, tocopherol, ascorbic acid, thiamine, riboflavin, vitamin $B_6$, vitamin $B_{12}$, vitamin K, niacin, folic acid, biotin, and combinations thereof.

14. The method according to claim 10, wherein step (b) comprises subjecting the solution to a pasteurization process.

15. The method according to claim 14, wherein the pasteurization process is chosen from the group consisting of hot-filling, aseptic packaging, ozonation, radiation, UV light, high pressure, membrane permeation, pulsed electric field, sonication, and combinations thereof.

16. The method according to claim 15, wherein the one or more flavor components is chosen from the group consisting of fruit flavors, botanical flavors, and mixtures thereof.

17. A method for producing a calcium fortified beverage consisting of:
   (a) combining purified water and a calcium source consisting of a hydrate form of calcium sulfate to form a solution,
   wherein said calcium provides about 10% U.S. RDV of calcium per serving of said calcium fortified beverage composition;
   (b) adding one or more flavor components
   (c) preserving the solution to form the calcium fortified beverage composition.

18. A beverage composition consisting of:
   purified water, and
   about 10% U.S. RDV of calcium per serving of said beverage composition,
   wherein the beverage composition is produced by combining purified water and a calcium source consisting of a hydrate form of calcium sulfate to form a solution.

19. The beverage composition according to claim 18, wherein the hydrate form of calcium sulfate is calcium sulfate dihydrate.

20. A method of providing about 10% of the U.S. RDV of calcium to a subject comprising administering to the subject the beverage composition of claim 18.

21. A calcium fortified beverage composition consisting of:
   purified water,
   one or more non-mineral nutritional supplements,
   a flavor component,
   a preservative system, and
   a calcium source consisting of a hydrate form of calcium sulfate,
   wherein said calcium source provides about 10% U.S. RDV of calcium per serving of said calcium fortified beverage composition.

22. A calcium fortified beverage composition consisting of:
   purified water,
   one or more non-mineral nutritional supplements,
   a preservative system, and
   a calcium source consisting of a hydrate form of calcium sulfate,
   wherein said calcium source provides about 10% U.S. RDV of calcium per serving of said calcium fortified beverage composition.

23. A calcium fortified beverage composition consisting of:
   purified water,
   one or more non-mineral nutritional supplements,
   a flavor component, and
   a calcium source consisting of a hydrate form of calcium sulfate,
   wherein said calcium source provides about 10% U.S. RDV of calcium per serving of said calcium fortified beverage composition.

24. A calcium fortified beverage composition consisting of:
   purified water,
   a flavor component,
   a preservative system, and
   a calcium source consisting of a hydrate form of calcium sulfate,
   wherein said calcium source provides about 10% U.S. RDV of calcium per serving of said calcium fortified beverage composition.

25. A method for producing a calcium fortified beverage composition consisting of:
   (a) combining purified water and a calcium source consisting of a hydrate form of calcium sulfate to form a solution,
      wherein said calcium source provides about 10% U.S. RDV of calcium per serving of said calcium fortified beverage composition;
   (b) adding one or more non-mineral nutritional supplements;
   (c) adding one or more flavor components; and
   (d) preserving the solution to form the calcium fortified beverage composition.

* * * * *